United States Patent [19]
Widman et al.

[11] Patent Number: 5,674,557
[45] Date of Patent: Oct. 7, 1997

[54] METHOD FOR TRANSIENTLY WETTING LENS MOLDS IN PRODUCTION OF CONTACT LENS BLANKS TO REDUCE LENS HOLE DEFECTS

[75] Inventors: Michael Widman; James Jen; John Enns, all of Jacksonville, Fla.; Mehmet Burduroglu, Yenikoy Istanbul, Turkey

[73] Assignee: Johnson & Johnson Vision Products, Inc., Jacksonville, Fla.

[21] Appl. No.: 536,929

[22] Filed: Sep. 29, 1995

[51] Int. Cl.[6] .............................. B05D 3/02; B29D 11/00
[52] U.S. Cl. ........................... 427/133; 427/377; 427/384; 264/1.1; 264/2.3
[58] Field of Search ................................. 427/133, 377, 427/384; 264/1.1, 2.3

[56] References Cited

U.S. PATENT DOCUMENTS

| | | | |
|---|---|---|---|
| 4,150,073 | 4/1979 | Neete | 264/1.1 |
| 4,419,463 | 12/1983 | Atkinson et al. | 264/1.1 |
| 4,534,916 | 8/1985 | Wichterle | 264/1.1 |
| 4,806,287 | 2/1989 | Sulc | 264/1.1 |
| 4,983,332 | 1/1991 | Hahn et al. | 264/1.1 |

*Primary Examiner*—Janyce Bell

[57] ABSTRACT

Hydrophilic contact lens molds are transiently modified to provide a water dynamic contact angle equal to or less than 100° by treatment with a wetting agent which may be water or a surfactant composition which provides a mold surface having a water wetting force of at least 70 mg to afford a reduction in lens hole defects in hydrophilic contact lens manufacture.

10 Claims, 1 Drawing Sheet

METHOD FOR TRANSIENTLY WETTING LENS MOLDS IN PRODUCTION OF CONTACT LENS BLANKS TO REDUCE LENS HOLE DEFECTS

BACKGROUND OF THE INVENTION

1. Field of the Invention

This invention relates to methods for reduction of defects in, and an improvement in yield, in the production of contact lens blanks. More particularly, it provides measures to control and minimize lens blank defects known as lens holes.

Contact lens prepared from hydrophilic hydrogel polymeric materials are now well known, and are prepared commercially in great volume in highly automated manufacturing facilities. As these products are intended for intimate contact with the eye, great care is taken to assure that they meet stringent quality control standards. This can result in a relatively high reject rate, adversely affecting economies in their production.

Accordingly, it is an object of the invention to control and minimize lens blank defects, specifically lens holes. Additionally, it is an object to afford a method operable in high speed automated manufacturing operations to improve yields adversely affected by rejects due to lens holes. Further, it is an object to provide means for reducing lens hole defects originating in the filling operation and attributable to uneven distribution of the reactive monomer mixture forming the lens blank. It is also an object to provide a method for effecting even distribution of reactive monomer mix about and upon the convex or backcurve mold. Finally, it is an object to modify and render relatively uniform the surface energy of a mold surface on a temporary or transient manner i.e. without a permanent change to the mold surface.

Processes for preparing hydrogel contact lens blanks have been well documented. Briefly, reactive monomer mix (RMM) for the formation of hydrophilic contact lenses is dispensed into a concave or frontcurve mold, formed from a hydrophobic polymer such as polystyrene, at a filling station. A convex or backcurve mold is then brought into proximate engagement with the frontcurve mold to form and shape the lens blank therebetween. Next a mechanically associated assembly formed from the frontcurve mold/RMM/backcurve mold is traversed through a UV curing tunnel under conditions to cure the RMM. The cured lens blank products associated with the forming molds are then dissociated by removing the backcurve mold. The cured lens/frontcurve assembly is then traversed through leaching and hydration tanks, and a contact lens is thereby produced.

The continuous process implementing the complete manufacturing process utilizes a lens mold manufacturing zone, comprising first and second injection molding stations for the formation of concave and convex lens molds, respectively, and includes a transport line upon which concave and convex lens parts may be conveyed from zone to zone; an enclosed zone ('nitrogen tunnel') maintained under nitrogen for degassing mold halves or sections; a filling zone for filling concave mold sections with reactive monomer composition, registering concave and convex mold sections in aligned relation, and engaging same in mating molding relation optionally under vacuum conditions, and precuring said reactive monomer composition with ultraviolet light to a gel-like state, and a curing zone in which the cure is completed and the finished lens blank readied for demolding. It will be appreciated that the entire process is integrated via transport means, generally one or more conveyors upon or in relation to which lens molds are assembled, arranged or interleaved in the course of conveyance through the said zones or stations in operational sequence. The lens molds may for convenience be situated in or upon mini-pallets (for example, fabricated of cast aluminum, stainless steel or the like) containing a number of lens molds (for example eight) arranged regularly thereon in spatial relation correlated with the treatment stations and the automated material transfer equipment where employed. All of the conveyance belts or tunnels are under nitrogen or inert gaseous blankets.

In greater pertinent detail, the concave or frontcurve mold incorporating an optical molding surface together with a peripheral zone or flange for interactive engagement with the convex or backcurve mold is traversed through a stamping station in which the peripheral flange portion of the mold is treated with a surfactant material without contact with the optical surface of the mold, as described and claimed in copending and commonly assigned U.S. Ser. No. 08/258, 263, now U.S. Pat. No. 5,542,978 of Kindt-Larsen et al. for METHOD AND APPARATUS FOR APPLYING A SURFACTANT TO MOLD SURFACES incorporated herein by reference; the mold is thereafter filled, sometimes to overflowing with reactive monomer mix whereupon the frontcurve mold is engaged in mating relation with the convex or backcurve mold, (the optical surface of which is typically untreated); the paired, juxtaposed mold assembly including the RMM molded therebetween, is passed to a curing zone and thence to a first demolding station at which the mold sections are disengaged. Facilitated by the presence of the surfactant upon the peripheral flange of the frontcurve mold, the excess material is separated from the remainder of the cured lens blank and retained with the convex or backcurve mold; the optical portion of the lens then is retained by the frontcurve mold, whereupon the excess waste material may be removed from the backcurve mold by any suitable mechanical means, wherefore the frontcurve mold associated with the retained lens blank free of excess peripheral material is passed to leaching and hydration stations, ultimately to be demolded, the contact lenses to be collected, and prepared for shipment.

Aspects and preferred features of the contact lens manufacturing system in part described and claimed herein are detailed in copending and commonly assigned application Ser. No. 08/258,267, now abandoned of Lust et al. for Apparatus for Removing and Transporting Articles from Molds; application Ser. No. 08/257,786, now abandoned of Wang et al. for Production Line Pallet System; Ser. No. 08/257,792, now U.S. Pat. No. 5,441,901 of Martin et al. for Mold Clamping and Procedure of a Polymerizable Hydrogel; the application Ser. No. 08/257,785, now U.S. Pat. No. 5,540,410 of Lust et al. for Mold Halves and Molding Assembly for Making Contact Lenses; and application Ser. No. 08/257,802, now U.S. Pat. No. 5,498,528 of Martin et al. for On-Line Injection Molding with Nitrogen Blanket, the disclosures of all of which are incorporated herein by reference.

In the course of commercial operations including high speed production of lenses in volume, a small member of defects can seriously affect yield, and resultant economics of the process. This is particularly the case where, in consequence of the use of automated manufacturing equipment a defect in a single lens can result in the loss of a larger number of lenses with which it is associated for example in the course of being transferred via integral pallets or frames from one manufacturing station to another.

Lens defects occur for many reasons, including simple misalignment of manufacturing equipment, but as the latter is readily correctable through engineering adjustment, interest is focussed principally on lens holes and puddles formed in the course of filling and curing steps, employing the reactive monomer mix (RMM).

Lens holes include voids i.e. areas which contain no monomer, pits i.e. areas of nonuniform thickness, and other similar regularities such as uneven edges, being a function of the efficiency of spreading of the reactive monomer mix on the surface of the convex backcurve mold when the two mold halves are joined.

Puddles, another lens defect, in random or tree branch shapes generally found along the lens edge, are generated during the curing step, and are associated with the concave or frontcurve mold.

High speed photography has demonstrated the formation of lens holes in the filling operation during the spreading of the advancing meniscus of the RMM upon the convex or backcurve mold. However, the occurrence of the defect is apparently indiscriminate, especially considering the number of sound lenses produced in the same manner on the same equipment. It had already been established that on a macro scale, RMM wets the polystyrene mold surface well.

However, fundamental studies (based upon work reported by R. H. Dettre and R. E. Johnson Jr. *J. Phys. Chem.* 68, 1507 (1096) and in *Surface and Colloid Science*, E. Matijevic, Ed., Wiley-Interscience, N.Y. 1969, 161.2 pp. 85 and S. P. Wesson, *TRI Progress Report #49*, Textile Research Institute, Princeton N.J. Aug. 23, 1992) showed that the mold surface, formed of a hydrophobic polymer such as polystyrene, was a low energy heterogeneous surface having a small portion of high energy surface domains. This was consistent with knowledge that the molding resins were typically fabricated for injection molding purposes to contain certain additives including mold release agents, which could provide the high energy domains on the mold surface.

There was in consequence established the need for means to modify the surface activity at the interface between the convex or backcurve mold and the reactive monomer mix, in the context of dynamic lens formation during molding and in particular, during the original contact with the RMM, and the advancing meniscus thereof onto and across the convex mold. In particular, it was desired to establish during molding an increase in the high energy surface area exhibited by the convex mold.

2. Discussion of the Prior Art

In order to implement the high-speed and mass-production molding of such hydrophilic contact lenses, there have been developed two-part molds incorporating pallet-supported mold structures; for example, as disclosed in U.S. Pat. No. 4,640,489 to Larsen, and methods of forming shaped polymeric hydrogel articles, such as hydrophilic contact lenses, elucidated in the disclosures of U.S. Pat. Nos. 4,680,336 and 5,039,459 to Larsen et al.

The release of hydrophilic contact lenses from adherent mold surfaces subsequent to the completion of the contact lens molding process can be facilitated or improved upon, as is set forth in the disclosure of U.S. Pat. No. 5,264,161 to Druskis et al. In that instance, surfactants are introduced in solution into a hydration bath employed in the molding cavities for molding the hydrophilic polymeric structures or contact lenses. The surfactant which is dispersed in the hydration bath in concentrations not exceeding 10% by weight aids in facilitating release of the lenses from adherent contiguous mold surfaces being separated, the function of such surfactant being to reduce the surface tension properties of water or liquids, and to thereby reduce the level of adherence between components consisting, on the one hand, of the contact lenses and, on the other hand, the mold surfaces which become adherent during molding. Numerous types of surfactants are disclosed in this patent publication, such as polymeric surfactants including polyoxyethylene sorbitan mono-oleates, which are especially suitable for releasing in an undamaged state any hydrophilic polymer articles from adherent mold surfaces which are constituted of plastic materials.

U.S. Pat. No. 4,159,292 describes the use of silicone wax, stearic acid and mineral oil as additives for plastic mold compositions to improve the contact lens release from the plastic molds. Commonly assigned U.S. patent application Ser. No. 08/414,999 of Kindt-Larsen et al., incorporated herein by reference, discloses the use of internal surfactant or mold release agents to facilitate lens separation from the optical surface of lens molds.

The use of surface applied surfactants as release agents in connection with the manufacturing of hydrogel contact lenses is disclosed and claimed in copending and commonly assigned application Ser. No. 08/431,612 filed May 1, 1995 by Kindt-Larsen et al. as a continuation-in-part of application Ser. No. 08/258,263 filed Jun. 10, 1994, now U.S. Pat. No. 5,542,978 each of which is incorporated herein by reference. In that application, a thin layer or film of a surfactant such as Tween 80 is applied via a stamping head to surface regions extending about, i.e., peripherally of the frontcurve of a mold part for the forming of contact lenses, to facilitate the lens release upon demolding of all or part of the peripheral rings of RMM material expressed externally of the mold by virtue of overrun during filling. In this application, no surface active material is applied to the portion of the mold defining the optical face of the lens.

In these circumstances, primary consideration is directed to the physical difficulty engendered by adhesion of the contact lens to one or another of the mold surfaces, or to efficient handling of waste material resulting from overrun of the RMM in filling. In automated operations it is significant to assure uniform reliable separation of mold components, waste, and contact lens product on a consistent basis. In consequence, efforts are centered upon the steps of demolding following filling, in which the concern is to assure preferential displacement of the concave and convex molds relative to the contact lens blank and the waste portion, if any, at the periphery of the product along the peripheral flange of the mold. In preferred manufacturing practice, the contact lens is retained by the front curve or concave mold while the waste portion at the periphery is disengaged from the peripheral flange thereof and retained by the convex mold assembly as it is mechanically disengaged from molding relation. This first demolding is contrasted with the second demolding of the cured, hydrated contact lens from the front curve mold. Different conditions and considerations obtain of course, in each of these demolding operations.

An entirely distinct problem is presented by the perceived need to control the wettability of the convex mold surface to the RMM in an endeavor to reduce lens hole defects. The release characteristics of the mold surface for demolding do not straightforwardly correlate to the wettability phenomenon especially under varying ambient conditions and potential compositional variations in the RMM formula. Moreover, molds having a modified surface, as by internal loading with an agent such as zinc stearate, while useful in affording wettability to the RMM interface, on the one hand can offer only a singular level of surface energy domains at any one time, and if reused, may offer degradation in that characteristic with use over time as an internal lubricant source is exhausted by exudation. Furthermore, the phenomena of wettability and demolding involve fundamentally different considerations, such that a semi-permanent change in the mold surface may favorably affect wettability but unfavorably affect demolding.

In consequence it is desired to meet the requirements for enhanced wettability at the mold/RMM interface in a more flexible and responsive manner, taking into account ambient conditions and other dynamic aspects of the manufacturing process such as speed of the operating line, hence time for mold wetting and demolding.

SUMMARY OF THE INVENTION

It has now been found that one may conveniently control characteristics of the mold surfaces critical to the minimization of lens hole defects by providing a transiently modified mold surface having an enhanced, more homogeneous population of surface domains of high energy thusly facilitating the wettability and spreadability of RMM across the mold surface under conditions of high speed automated operations.

More specifically, the hydrophobic optical surface of the mold may be treated with a removable surface agent forming a transient uniform coating thereon whereby the transfer efficiency at the RMM/mold interface is improved for the wettability and coating of that mold surface as the advancing meniscus of the RMM is engaged during the molding sequence. It is important to appreciate that the surfaces are engaged in mating relation about the RMM for microseconds during each molding cycle. Naturally, given the somewhat viscous nature of the RMM material, any domain of the mold seen to lack receptivity to, i.e. wetting by the RMM will be bypassed in the dynamic spreading of the RMM upon and around the defining surface of the mold, leading to defects.

Given that the mold where reused may cycle thousands of times per hour an internal lubricant such as zinc stearate, while effective in most cases, may not over longer runs at high speeds and under different ambient conditions be capable of controlling surface characteristics consistently; the periodic modulation of surface characteristics provided by a surface coating of transient nature offers operating advantages and greater certainties of yield with improved quality performance, together with flexibility and responsiveness to ambient conditions, as aforesaid.

More specifically it has been recognized that ambient operating conditions, in particular relative humidity, can impact the wettability of the mold contact surface for the hydrophilic RMM - and when employed along or in conjunction with the use of surface applied surfactants or internal lubricants can establish satisfactory conditions for minimization of lens hole defects. Control of this variable alone under proper conditions can also be effective.

As is well known, relative humidity commonly refers to an ambient moisture condition in the surrounding air, which will of course vary seasonally as in response to heating or air-conditioning conditions obtaining in the manufacturing environment. That environment itself may be controlled or a microclimate may be created by at least partial closure of any operating zone, in this case the filling zone of the manufacturing zone. The latter constitutes a particularly convenient application where a surfactant is used, conjuntively, as either or both of a reduced humidity and reduced level of surfactant may be employed, and recovery of excess chemical agents from the enclosed zone may be more readily achieved for better environmental control and recycling.

In general it has been found that maintenance of a relative humidity of 60 to 80% in the area of the filling zone is sufficient to maintain a surface condition on the optical surface of the mold of satisfactory receptivity to efficient spreading of the RMM on the mold surface to achieve minimization in lens hole defects. Such a condition may be effected as necessary by spray jets or other vaporization source inducing a higher level relative humidity than that obtained under ambient conditions; or those conditions themselves, specifically ambient temperature, may be manipulated to induce the desired relative humidity in a manner well known in the art. Thus the temperature in the zone may be increased, as by the use of electric strip heaters to permit the ambient air to accommodate a higher relative humidity. The temporal or transient nature of the condition is appreciated when one recognizes that the moisture coating is readily absorbed upon contact with the reactive monomer mix.

In a alternative embodiment described and claimed in concurrently filed Appln. Ser. Nos. 08/536,944 of Jen, et al., for Method of Reducing Lens Hole Defects in Production of Contact Lens Blanks, incorporated herein by reference, the convex mold is pretreated by application of a surface active agent to at least the contact face of the mold by applying, as by spraying, dipping or any other suitable means, a surfactant such as Tween 80, appropriately in a solvent vehicle therefor such as water, to provide a concentration of 0.05 to 5.0% w/w of surfactant. The pretreatment may be applied in conjunction with i.e. to precede each mold cycle or may be effected intermittently, to maintain the required surface energy requirements for reduction of lens hold defects. The amount of surfactant to be employed will also be gauged by a certain balance between measures taken to ensure desired lens release preferentially from the convex molding surface at this stage; and lens demolding from the concave or frontcurve mold following cure. Thus, in a preferred embodiment, described in concurrently filed and commonly assigned application Ser. No. 08/536,760, of James Jen et al. for MOLD MATERIALS MADE WITH ADDITIVES the concave or frontcurve mold may be formed from a composition incorporating a compatible agent such as zinc stearate whereas the surface of the convex or backcurve mold is treated periodically with a surfactant in accordance with this invention as aforesaid.

In this manner, it has been shown that lens hole defects can be reduced by as much as several percent in a high speed automated pilot production line thereby effecting substantial economic savings while increasing efficiency of the manufacturing operation.

DETAILED DESCRIPTION OF THE INVENTION

Figure 1:
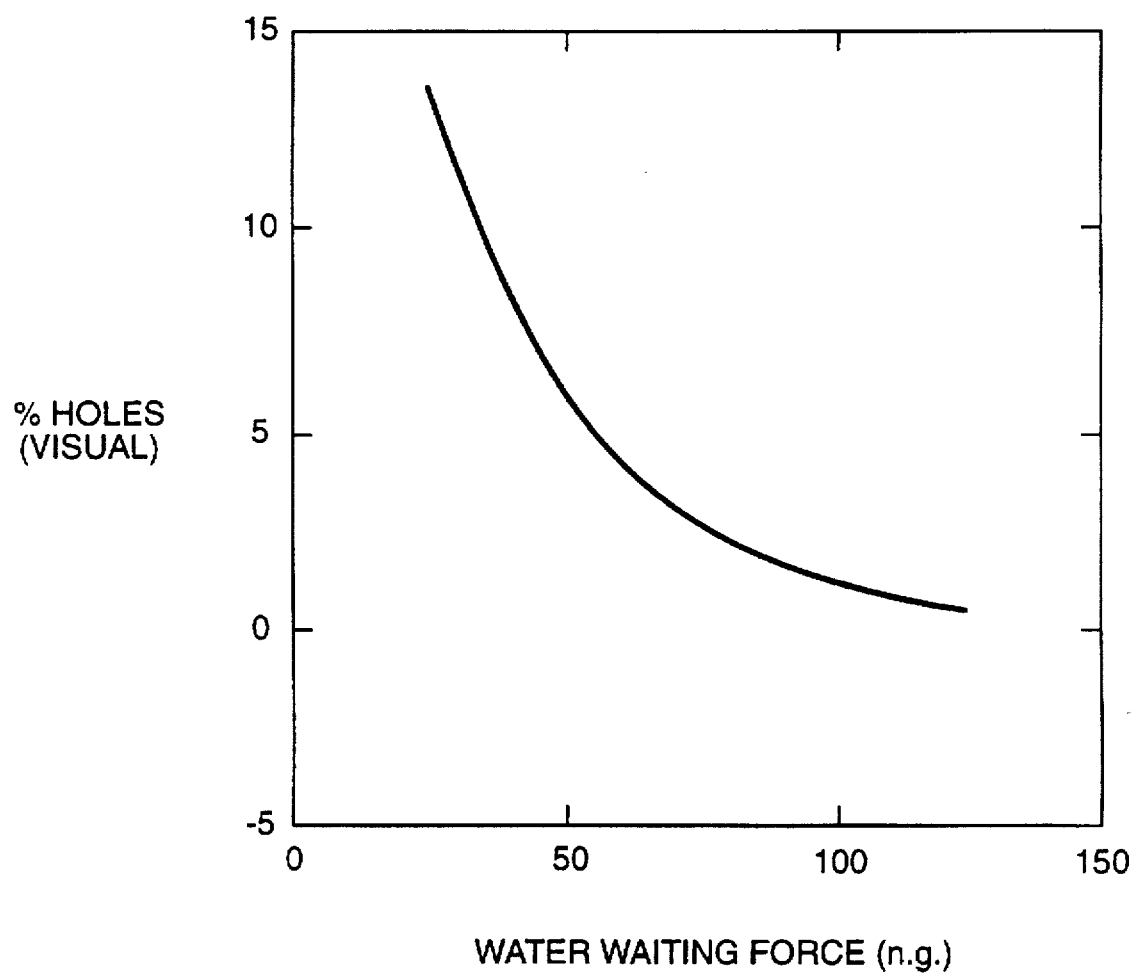
FIG. 1 is a graph of the % lens holes (visual) vs. water wetting force (mg) of lens holes reduction with increasing water wetting force and illustrating the preference herein for the use of wetting agents exhibiting a water wetting force generally in excess of 70 mg.

In accordance with the invention, the interfacial tension between the reactive monomer mix, more specifically the advancing meniscus thereof, and the optical surface of the convex or backcurve mold is controlled and minimized by normalizing and extending the surface areas representing high surface energy domains in the convex mold contact surface. This is accomplished by the temporal or transient application of a surface modifying agent to the optical surface of the convex mold in amount and characteristics effective to increase the population of the high surface energy areas on the convex mold surface to afford improved wettability by the RMM and effecting a differential in surface energy as between the respective mold halves, to overcome the energy required to separate the two mold halves so to preferentially effect the retention of the optical lens portion on the frontcurve mold.

Thus, it will be appropriate to consider the surface characteristic expressed in and upon the frontcurve mold in applying the precepts of this invention, as it is desired to assure that the lens blank be demolded preferentially from one mold surface consistently throughout the manufacturing process, usually (and as described herein) from the convex mold, thereby permitting the retention of the lens blank in the concave frontcurve mold in its precured, prepolymerized state for traverse to and through the remaining manufacturing stages. In consequence, it is necessary to take into account, relative to the type and amount of surface modifying agent to be applied to the convex mold surface, whether the frontcurve or concave mold has itself been pretreated, usually by an internal additive such as zinc stearate to modify the surface characteristics of the mold, as disclosed in concurrently filed and commonly assigned application Ser. No. 08/536,760. More specifically, one implements the practice of the present invention in such manner as to assure that, relative to the surface energy retentive characteristics of one mold surface, that a certain effective differential be induced in the second mold surface, to effect preferential displacement on a consistent basis throughout the manufacturing process. As aforesaid, it is understood that it is preferred that the differential referred to favors release from the convex surface, especially because the benefits of reduced lens defects arising from poor wetting of the convex surface with RMM can thereby also be realized.

The selection of surface modifying means is directly related to the wettability of the mold surface by the RMM as aforementioned. The theoretical estimation of wetting, which is the thermodynamic parameter called the spreading coefficient, is defined as:

$$S = \gamma_s - \gamma_l - \gamma_{sl}$$

where S is the spreading coefficient, $\gamma_s$ is the surface energy of the mold material, $\gamma_l$ is the surface tension of the reactive monomer mix ("RMM") and the $\gamma_{sl}$ is the interfacial tension between reaction monomer mix and the mold material. A positive "S" indicates spreading (or wetting). Therefore, in order to spread or to wet, $\gamma_l$ and $\gamma_{sl}$ should be made as small as possible or should be made as large as possible. Practically, this means that the surface energy of the mold is increased or the surface tension of the reactive monomer mix is reduced or both is performed in order to obtain the appropriate wetting between reactive monomer mix and the mold. With respect to increasing the mold surface energy, this requires consideration of increasing not only the total surface energy, but also increasing the portion of high energy surface.

Thus, one method of affording improved wettability is to reduce surface tension of the RMM by incorporating therein a surfactant (as disclosed in concurrently filed, commonly assigned Appln. Ser. No. 08/536,944 of James Jen et al. for METHOD FOR REDUCING LENS HOLE DEFECTS IN PRODUCTION OF CONTACT LENS BLANKS, incorporated herein by reference. Another method with similar effect is to heat the RMM, which can reduce surface tension from 38 dynes/cm at 20° C. to 34 dynes/cm at 60° C. which a concomitant decrease is viscosity.

The mold surface when composed of polystyrene is highly non-polar, and has a surface free energy of 42 dynes/cm. Wetting between the RMM and the mold surface is alternatively improved by the presence of a surface modifying agent such as moisture at the interface in the form of a thin layer. The surface energy of a water thin film is 72 dynes/cm hence a significant increase of surface energy is readily achieved by coating a thin water layer on the polystyrene mold surface. A uniform thin moisture layer on the polystyrene mold surface represents a homogenous high energy, highly wettable surface. After assembly of the mold surfaces about the RMM the water layer is absorbed by the RMM, rendering the mold surface again less wettable and favoring lens demolding, emphasizing the importance of a transiently modified surface.

To correlate the improvement in lens hole defect performance to water wettability, a modified Wilhelmy wetting method was developed to measure the wettability of polystyrene backcurve molds. Water was used as the probe liquid because of its high surface tension and its high polarity. The experimental detail is set forth in working Example 1.

FIG. 1, a plot of water wetting force vs lens hole defects, is illustrative. The plot shows that a mold surface with a water wetting force greater than 70 mg produces little or no lens holes. A larger value represents a large wetting force and indicates the mold surface is more wettable. Among the findings was the observation that untreated mold surfaces evidenced a large variation in wetting properties consistently with the practical appreciation that lens hole defects occur on an apparently random, sporadic basis in production.

To determine the feasibility of surface treating mold material for use in the backcurve mold to reduce the tendency to form lens holes in the contact lenses, the inventors developed a modified wetting method to measure the wettability of the backcurve mold. This method measures the wetting forces between the probe wetting liquid (D.I. water) and the backcurve mold surface defined by the relationship:

$$F = 2\gamma \cos \Theta$$

wherein

F is the wetting force (mg) of the mold half being measured;

γl is the surface tension of the probe liquid, i.e., the water;

p is the perimeter of the mold half at the meniscus (cm) when the mold half is partially immersed in the water; and Θ is the dynamic contact angle in degrees 0.

In accordance with the invention, it has been determined that a backcurve with a water dynamic contact angle less than or equal to 100° produces contact lenses with significantly less lens holes. It is more preferred that the contact angle be less than or equal to 90°; and particularly preferred that such angle be less than or equal to 75°.

The surface modifying or wetting agent may be a surfactant; where consistent with the foregoing criteria, its selection is not critical, insofar as it is capable in relative release characteristics relative to RMM and in differential release characteristics relative to the companion mold surface to which it is not applied to achieve the benefits of the invention as outlined herein. Naturally, to the extent that the surfactant is absorbed into the RMM, or remains to a certain extent on the surface of the lens after hydration, it will be selected with regard to its physiological or pharmaceutical acceptability for human use in eye contact. The surface tension modifying characteristics of the surfactant material in the circumstances obtaining will be assessed relative to the desired differential release property; and the surface energy modifying characteristics will be assessed relative to the enhanced wettability for the RMM in relation to the mold surface (in particular, the convex mold surface, as aforesaid) in a manner well known to the artisan. The surfactant material is also selected for compatibility with the mold materials and the reactive monomer mix. While, as a consequence, amounts to be applied may differ in response to these characteristics, it has been found that in most cases, a selected application in the range of 0.05 to 5.0 weight % of a solution of the surfactant material is sufficient, usually 0.05 to 2.0 weight %.

Among otherwise suitable surfactants, anti-static agents, ionic surfactants, non-ionic surfactants or lubricant formulations may be employed in the present invention. Suitably, the surfactant constitutes a solution or dispersion of the surface active agents in an essentially inert vehicle to facilitate application to the mold surface by spraying, wiping, vapor deposition, sponging, dipping or the like. Thus, water, an alkanol or mixtures thereof may be satisfactorily and economically used to constitute a solution or dispersion of the surface active agent.

Among the materials found to not only aid in wettability of the mold surface but also to retain effective release characteristics for lens demolding from the frontcurve mold (where so applied) after hydration and equilibration in saline is Tween 80 (registered trademark); i.e., a Polysorbate 80. This is basically polyethylene oxide sorbitan mono-oleate or the like equivalent, and consists of an oleate ester of sorbitol and its anhydrides copolymerized with approximately 20 moles of ethylene oxide for each mole of sorbitol and sorbitol anhydrides, of generally the formula:

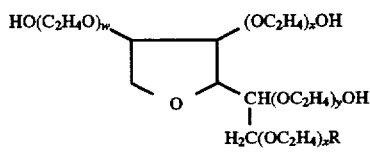

[Sum of w, s, y, z, is 20; R is $(C_{17}H_{33})COO$]

Generally, water soluble or water dispersible materials are preferred for ease of application. As the mold materials are typically manufactured from hydrophobic materials such as polypropylene or polystyrene, the wettability efficiency for these materials is significant.

Other materials suitable for use include the pharmaceutically acceptable ethoxylated amines and quaternary ammonium compounds such as Larostat 264 A (a soy dimethyl ethyl ammonium ethosulfate sold by PPG), Armostat 410 (an ethoxylated tertiary amine sold by Akzo), Cystat SN (3-lauramidopropyl trimethylammonium methyl sulfate sold by Cytec) and Atmer 163 (N,N-bis (2-hydroxyethyl) alkylamine)). Other quaternary compounds include the diamidoamines, the imidazoliniums, the dialkyl dimethyl quaternaries, the dialkoxy alkyl quaternaries, and the monoalkyl trimethyl quaternaries. Certain of these materials offer the further advantage of being soluble in RMM and hence are conveniently resorbed into the lens material, leaving the mold surface unaffected upon release and therefore more readily recycled for further use, without cleansing to a base, or neutral condition.

The surface active or wetting agent may be applied to the mold surface by spraying or swabbing or dipping, as aforesaid, such that the surface is evenly coated therewith. The mold is merely drip-dried with or without the aid of heat and stockpiled for use in the manufacturing process. The amount of surfactant so applied is adapted to provide a uniform coating of 0.05 to 0.5 weight % solution of surfactant on the surface of the mold, as aforesaid.

The application of the surface modifying or wetting agent may alternately be suitably integrated with the manufacturing process such that the molds may be treated immediately prior to their interpolation with the transport mechanism, or just prior to the filling operation, such that the surface thereof is fully wetted, i.e., undried at the point of contact with the reactive monomer mixture.

The molds can be made from any thermoplastic material which is suitable for mass production and can be molded to an optical quality surface and with mechanical properties which will allow the mold to maintain its critical dimensions under the process conditions employed in the process discussed in detail below, and which will allow polymerization with the initiator and radiant energy source contemplated. The concave and convex mold members can thus be made from thermoplastic resins. Examples of suitable materials include polyolefins such as low, medium, and high density polyethylene, polypropylene, including copolymers thereof; poly-4-methylpentene; and polystyrene. Other suitable materials are polyacetal resins, polyacrylethers, polyarylether sulfones, nylon 6, nylon 66 and nylon 11. Thermoplastic polyesters and various fluorinated materials such as the fluorinated ethylene propylene copolymers and ethylene fluoroethylene copolymers may also be utilized.

It has been found that with the need for a high quality, stable mold and especially for the use of a plurality of molds in high volume operations the choice of material for the molds is significant. In the present invention the quality of production is not assured by individual inspecting and sorting each lens for power and curvature. Instead the quality is assured by keeping the dimensions of each individual mold member within very tight tolerances and processing molds in particular sequential steps to give all lenses equal treatment. Since polyethylene and polypropylene partly crystallize during cooling from the melt there is a relatively large shrinkage giving dimensional changes difficult to control. Thus, it further has been found that the most preferred material for the molds used in the present process is polystyrene which does not crystallize, has low shrinkage, and can be injection molded at relatively low temperature/to surfaces of optical quality. It will be understood that other thermoplastics, including those mentioned above, may be used provided they have these same properties. Certain copolymers or blend of polyolefins that exhibit these desirable characteristics are also suitable for the present purposes as are polystyrene copolymers and blends having such characteristics, as described more fully in U.S. Pat. No. 4,565,348.

The soft contact lens blanks are formed from a reactive monomer composition which typically incorporates in addition to the reactive monomer a water displaceable diluent in the case of the preparation of a hydrophilic lens, a polymerization catalyst to assist in curing the reactive monomer, a cross-linking agent and often a surfactant to aid in mold release.

The curable compositions preferably include copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacryl acid, glyceryl methacrylate, and dimethylamino ethyl acrylate.

Preferred polymerizable compositions are disclosed in U.S. Pat. No. 4,495,313 to Larsen, U.S. Pat. No. 5,039,459 to Larsen et al. and U.S. Pat. No. 4,680,336 to Larsen et al., the disclosures of which are hereby incorporated herein by reference. Such compositions comprise anhydrous mixtures of a polymerizable hydrophilic hydroxy ester of acrylic acid, a displaceable ester of boric acid and a polyhydroxyl compound having preferably at least 3 hydroxyl groups. Polymerization of such compositions, followed by displacement of the boric acid ester with water, yields a hydrophilic contact lens. The mold assembly utilized in the present invention may be employed to make hydrophobic or rigid contact lenses, but the manufacture of hydrophilic lenses is preferred.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4- butylene dimethacrylate, propylene glycol diacrylate, propylene glycol dimethacrylate, diethylglycol dimethacrylate, glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by ultraviolet light, electron beam or a radioactive source may also be employed to catalyze the polymerization reaction, optionally with the addition of a polymerization initiator. Representative initiators include camphorquinone, ethyl-4-(N,N-dimethyl-amino)benzoate, and 4-(2-hydroxyethoxy)phenyl-2-hydroxyl-2-propyl ketone.

Polymerization of the polymerizable composition in the mold assembly is preferably carried out by exposing the composition to polymerization initiating conditions. The preferred technique is to include in the composition initiators which work upon expose to ultraviolet radiation; and exposing the composition to ultraviolet radiation of an intensity and duration effective to initiate polymerization and to allow it to proceed. For this reason, the mold halves are preferably transparent to ultraviolet radiation. After the precure step, the monomer is again exposed to ultraviolet radiation to a cure step in which the polymerization is permitted to proceed to completion. The required duration of the remainder of the reaction can readily be ascertained experimentally for any polymerizable composition.

The mold assembly comprises at least two pieces, a female concave piece (frontcurve) and a male convex piece (backcurve), forming a cavity therebetween, and when said pieces are mated, at least one piece having a flange thereabout. More particularly, the mold assembly comprises a front mold half and a back mold half in contact therewith, thereby defining and enclosing a cavity therebetween, and a polymerizable composition in said cavity in contact with said mold halves, the front mold of which has a central curved section with a concave section with a concave surface, a convex surface and circular circumferential edge, wherein the portion of said concave surface in contact with said polymerizable composition has the curvature of the frontcurve of a contact lens to be produced in said mold assembly and is sufficiently smooth that the surface of a contact lens formed by polymerization of said polymerizable composition in contact with said surface is optically acceptable, said front mold also having an annular flange integral with and surrounding said circular circumferential edge and extending therefrom in a plane normal to the axis and extending from said flange, while the back mold has a central curved section with a concave surface, convex surface and circular circumferential edge, wherein the portion of said convex surface in contact with said polymerizable composition has the curvature of the backcurve of a contact lens to be produced in said mold assembly and is sufficiently smooth that the surface of a contact lens formed by polymerization of the polymerizable composition in contact with said surface is optically acceptable, said backcurve also having an annular flange integral with and surrounding said circular circumferential edge and extending therefrom in a plane normal to the axis of said convex structure, and a generally triangular tab situated in a plane normal to said axis and extending from said flange, wherein the convex structure of said back mold half contacts the circumferential edge of the front mold half.

The inner concave surface of the front mold half defines the outer surface of the contact lens, while the outer convex surface of the base mold half defines the inner surface of the contact lens which rests upon the edge. Specifics of such constructions are known having reference to U.S. Pat. No. 4,640,489 to Larsen; improvements are shown in U.S. Ser. No. 08/258,654 to Martin et al., incorporated herein by reference.

In applying the surface active material to the surface of the mold several considerations should be borne in mind: a sufficient level of surfactant is employed to uniformly cover the mold surface to effect the desired enhancement of wettability in the circumstances obtaining, the agent is retained on the surface in effective amounts for use in the filling operation, and where absorption into the RMM occurs, the amount of material employed is not in excess of that which can be diffused into and absorbed by the RMM prior to the solidification of the lens.

As is self evident, the wetting agent is pharmaceutically acceptable at the levels employed, and does not affect the surface or the efficacy of the finished lens.

In accordance with the invention, a convex mold surface which has been pretreated with the surface modifying agent, as aforesaid is brought into mating engagement with a frontcurve mold and the reactive monomer mix filling the molding cavity therebetween, during which process the optical surface of the convex mold contacts and by reason of its modified surface is efficiently wetted by the RMM such that the advancing meniscus uniformly coats the mold surface without the formation of lens hole defects. The convex mold, when mechanically separated from the concave mold by reason of its modified surface, efficiently (and consistently throughout the process, involving an interaction of similarly treated molds) releases the lens blank (which remains with the concave mold for curing) without tearing or otherwise damaging the lens blank.

In a preferred embodiment, the frontcurve mold is formed from a composition which comprises an added mold release agent such as zinc stearate, which aids in demolding of the lens blank after hydration, as disclosed in copending and commonly assigned U.S. Ser. No. 414,999, incorporated herein by reference. In consequence, its surface energy characteristics have been modified and an additional level of surface modifying agent (in this case a combination of water vapor and surfactant application) may be required in application to the convex mold surface to balance the release characteristics in such manner as to assure release of the lens blank for retention by the concave or frontcurve mold surface.

It will be understood in connection with the foregoing description that the concepts as well as theoretical considerations affecting demolding are entirely distinct from the problem of adequately wetting the surface of the forming mold with the monomer composition although each consideration is interrelated to the other in practice, i.e., one may successfully demold a lens blank which, however, is defective due to one or more lens holes. The contact portion of the convex lens mold in particular must be receptive to the monomer composition at the point and time of application under the conditions then obtaining, in the sense that it requires a critical wettability controlling efficient spreadability across the contact surface of the mold to be established, by increasing the surface area comprising high surface energy domains in the convex mold contact surface.

While the invention has been described with particular reference to application of the surface modifying agent to the optical surface of the convex mold in a particular manufacturing operation, including a generally vertical disposition of the mating mold elements with the concave member generally supporting the incipient lens blank in a supine or lower position, it will be understood that to effect preferential displacement of the lens blank as, for example, in other geometric arrangements the surface modifying agent may be applied to the optical surface of either lens mold surface.

Also, while the present invention has been primarily illustrated by reference to the control of a wettable surface on the convex mold optical surface to control lens hold defects, it is also effective in minimizing puddling on the concave lens surface facilitating the initial spreading and coating of the surface by the RMM in a uniform, homogenous manner.

EXAMPLE 1

A number of treated, backcurve molds were tested for water wetting force as follows: The treated mold is suspended vertically on a microbalance above a body of water functioning as a probe liquid. The water level is raised incrementally to immerse the backcurve. The wetting force between the probe liquid and the backcurve as the probe liquid is being raised is measured by the microbalance and recorded. A trace of the wetting forces as a function of distance travelled by the water meniscus over the backcurve is obtained from which the value p (the perimeter of the mold half at the meniscus (cm) when the mold half is partially immersed in the water) can be calculated which when taken together with the wetting force (mg) F can be employed to determine the dynamic contact angle in degrees according to the formula:

$$F = 2\gamma \cos \Theta$$

where $\gamma$ is the surface tension of water (72.75 dynes/cm at 20° C.). As described hereinabove, it is preferred that the water dynamic contact angle afforded by the treated surface is less than or equal to 100°, preferably less than or equal to 90°.

The apparent water wetting force for various treated and untreated backcurves is set forth as follows in Table 1.

TABLE 1

| MOLD SURFACE | WETTING FORCE |
| --- | --- |
| Untreated Polystyrene A | 56.4 |
| Untreated Polystyrene B | 56.9 |
| Untreated Polystyrene C | 50.9 |
| 0.25% CYASTAT LS*/Polystyrene B | 67.1 |
| 0.5% CYASTAT LS/Polystyrene B | 113.0 |
| 0.05% CYASTAT LS/Polystyrene C | 105.0 |
| 0.25% CYASTAT LS/Polystyrene C | 81.0 |
| 0.5% CYASTAT LS/Polystyrene C | 115.0 |

*(3-lauramidopropyltrimethylammonium methyl sulfacte, sold by Cytec Industries)

EXAMPLE 2

Convex molds were immersed in 2% aqueous solutions of Larostat 264 A (PPG), Armostat 410 (Akzo) and Cystat SN (Cytec), respectively, and then dried under ambient conditions for 48 hours. The thus formed coating rendered the surface more wettable by the RMM, a HEMA based composition.

When the treated molds were employed in an automated pilot manufacturing facility, lens mold defects were reduced by about 34.6%.

EXAMPLE 3

Polystyrene contact lens molds were swabbed with Glucam P-10, Tween 80 and an aqueous dispersion of Glucam DOE 120, respectively, and the molds were utilized in molding contact lenses employing a reactive monomer mix comprising 96.8% HEMA, 1.97% methacrylic acid, 0.78% ethylene glycol dimethacrylate, and 0.1% of trimethylolpropane trimethacrylate and 0.34% of Darvocur 1173 dispered (48% RMM) in glycerin boric acid ester as an inert water displaceable diluent. The mold halves were readily separated without defects.

Aspects of the invention described herein are related to subject matter disclosed and claimed in concurrently filed Appln. Ser. No. 08/536,944 of James Jen et al. for METHOD FOR REDUCING LENS HOLE DEFECTS IN PRODUCTION OF CONTACT LENS BLANKS incorporated herein by reference.

What is claimed is:

1. In a process for molding hydrophilic hydrogel contact lenses from a reactive monomer mixture in which cooperating concave and convex mold faces are interposed in molding relation about a cavity formed therebetween to form a contact lens blank, containing reactive monomer mixture the improvement which comprises treating at least one of said mold faces with a transient coating of an agent comprising condensed water vapor to facilitate wetting of said mold face with the reactive monomer mixture whereby lens hole defects and or puddle defects in said contact lens blanks are reduced.

2. The process of claim 1 wherein said agent further comprises a surfactant effective to render more homogeneous the high surface energy domains present on the mold surface.

3. The process of claim 2 wherein said agent is absorbable by said reactive monomer mixture.

4. The process of claim 1 wherein the convex backcurve is pretreated with the wetting agent.

5. The process of claim 1 wherein the mold is constructed of a hydrophobic material.

6. The process of claim 5 wherein said hydrophobic material in polystyrene.

7. The method of claim 1 wherein the wetting agent as applied to the optical mold surface exhibits a water wetting force of at least 70 mg.

8. The method of claim 1 wherein the treated optical surface of the convex mold exhibits a water dynamic contact angle of less than or equal to 100°.

9. In a process for molding contact lens blanks including filling a concave lens mold with a reactive monomer mixture, juxtaposing therewith in mating molding relation a convex lens mold, the improvement which comprises pretreating at least one of the optical surfaces of said molds with water vapor to condense an even coating of moisture thereon to enhance wettability of the optical surface to the reactive monomer mix.

10. In a process for molding hydrophilic hydrogel contact lenses from a reactive monomer mixture in which cooperating concave and convex mold faces are interposed in molding relation about a cavity formed therebetween to form a contact lens blank, containing reactive monomer mixture the improvement comprising maintaining a relative humidity of from about 60% to about 80% in the cavity.

* * * * *